US006085324A

United States Patent [19]
Ogram

[11] Patent Number: 6,085,324
[45] Date of Patent: *Jul. 4, 2000

[54] MONITORING AND REGULATORY SYSTEM FOR THE INTERNET

[76] Inventor: Mark E. Ogram, 780 S. Freeman, Tucson, Ariz. 85748

[ * ] Notice: This patent issued on a continued prosecution application filed under 37 CFR 1.53(d), and is subject to the twenty year patent term provisions of 35 U.S.C. 154(a)(2).

[21] Appl. No.: 08/856,324

[22] Filed: May 14, 1997

Related U.S. Application Data

[63] Continuation-in-part of application No. 08/873,307, Mar. 11, 1997, abandoned, which is a continuation-in-part of application No. 08/795,033, Feb. 5, 1997, abandoned.

[51] Int. Cl.[7] .............................. H04L 9/00; H04L 9/32; G06F 15/16
[52] U.S. Cl. ........................ 713/202; 713/201; 709/229
[58] Field of Search .............................. 395/200, 200.59; 358/405; 700/9; 380/21, 25; 713/200–202; 709/229

[56] References Cited

U.S. PATENT DOCUMENTS

| | | | |
|---|---|---|---|
| 5,623,601 | 4/1997 | Vu | 713/202 |
| 5,649,099 | 7/1997 | Theimer et al. | 713/201 |
| 5,684,950 | 11/1997 | Dare et al. | 713/202 |
| 5,878,233 | 3/1999 | Schloss | 395/200.55 |
| 5,889,958 | 3/1999 | Willens | 395/200.59 |
| 5,907,477 | 10/1999 | Roden | 705/32 |
| 5,987,606 | 11/1999 | Cirsole et al. | 713/200 |
| 6,006,334 | 12/1999 | Nguyen et al. | 713/202 |

*Primary Examiner*—Albert De Cady
*Assistant Examiner*—Shelly A Chase
*Attorney, Agent, or Firm*—Mark E. Ogram P.C.

[57] ABSTRACT

A regulatory system for a distributed system of computers in which authorized data files are marked with an indicia. The granting of the indicia is made by a variety of authorizing entities such as Internet Service Providers and governmental entities. The indicia acts as a "stamp" which is used to grant/deny passage of the data files to selected users. In practice, using the Internet as an example, data providers obtain the "stamp" from a regulating entity (i.e. the state government). The "stamp" is affixed to the data file. When the data is being transferred over the Internet, the access providing computer (which acts as an interface between a user's computer and the Internet) checks for the "stamp" and sends an inquiry via the Internet to the regulating entity's computer where the "stamp" is check for authenticity. Based upon the authenticity of the "stamp", the access providing computer passes the data to the user computer. In this manner, the regulatory entity is able to monitor and control subject matter over the distributed network of computers.

17 Claims, 8 Drawing Sheets

XXX.YYY.ZZ.AA

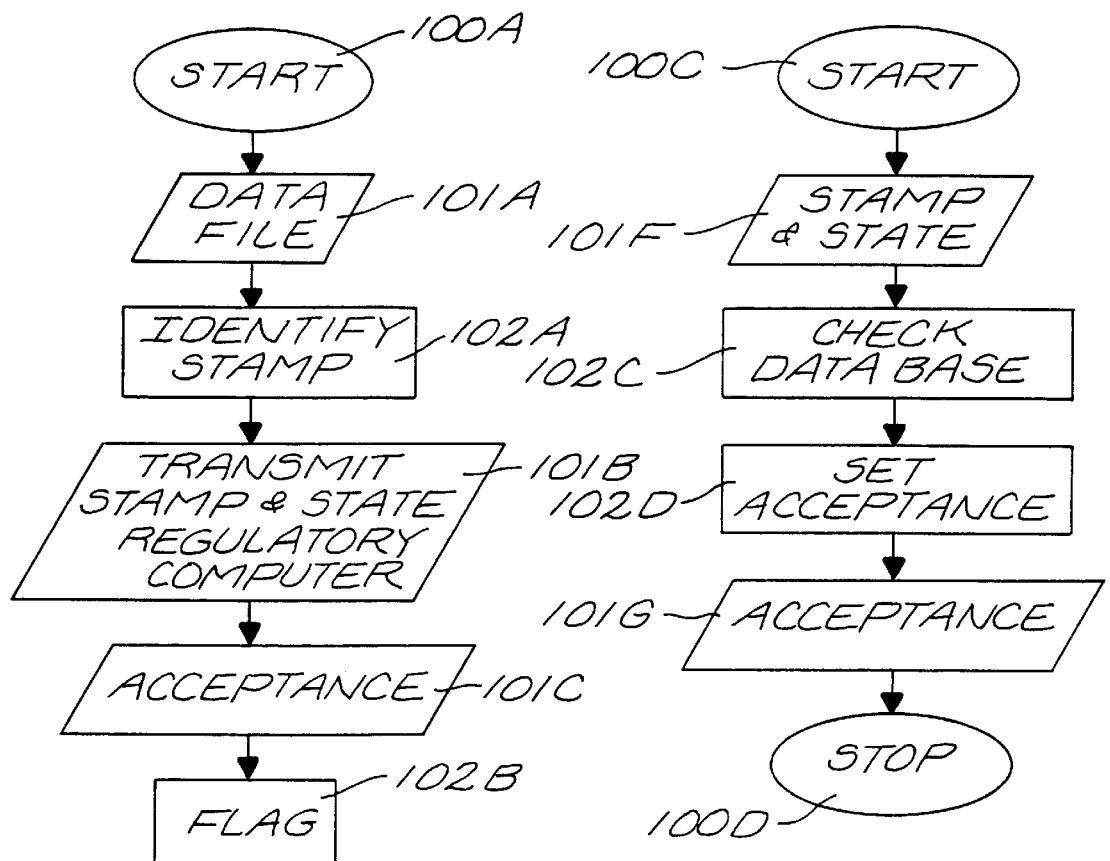
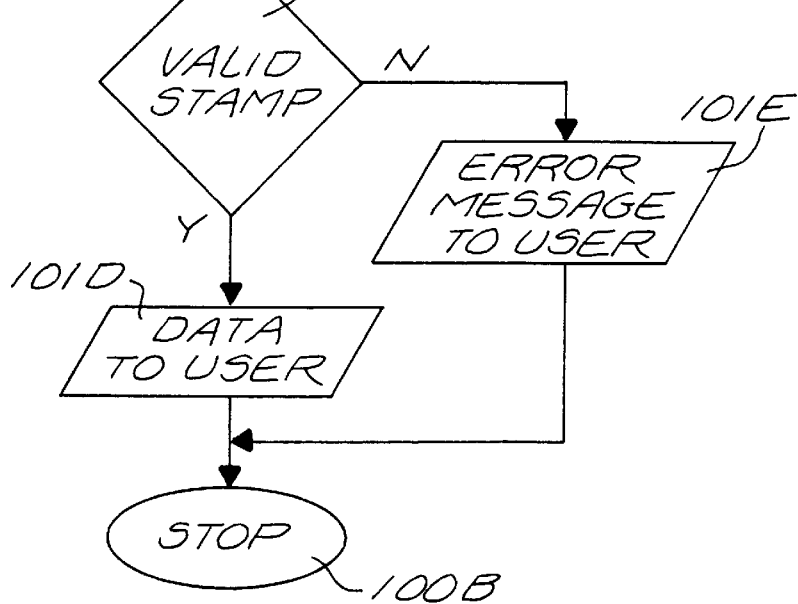
FIG. 10B
FIG. 10A

MONITORING AND REGULATORY SYSTEM FOR THE INTERNET

This is a continuation-in-part of U.S. patent application Ser. No. 08/873,307, entitled "A Secure Download System" filed Mar. 11, 1997 now abandoned; which was a continuation-in-part of U.S. patent application Ser. No. 08/795,033, filed Feb. 5, 1997 now abandoned, and entitled "A Computer Password System".

BACKGROUND OF THE INVENTION

This invention relates generally to computer systems and more particularly to regulatory control of information transmission over networks of computers.

Computer networks, such as the Internet, the World Wide Web, and most recently, Intranets, have opened up access to data as no other technological development has. Users are able to quickly and easily collect data (textual, image, and auditory).

While the collection of data has been vastly improved, any security for data has been severely hampered. Control of data dissemination has generally required the use of a dual password system. In this technique, the user is required to enter two passwords (often called the user ID and the password) which are then compared to a memory file to see if access is appropriate.

While the two password system is generally acceptable, often the password set is purloined by another user who then has complete access to the data from the safety of another site. Protection of the data then reverts to assuring that the password set itself is kept secure. This task though is almost impossible to achieve.

It is clear that there is a need for improvements in password systems.

SUMMARY OF THE INVENTION

The invention creates a regulatory system for a distributed system of computers in which authorized data files are marked with an indicia. A variety of techniques are well known for creating this indicia which are either visible (i.e. displayed for the end user) or "hidden"/embedded into the data file itself.

The granting of the indicia is made by a variety of authorizing entities such as Internet Service Providers and governmental entities. In the preferred embodiment, a central agency operates the system for all of the states and territories. Each state or territory establishes its own fee structure. The fees are collected by the central agency when a data provider wishes to distribute data within the state or territory.

The central agency provides a computer data base which identifies each indicia or "stamp" with the state and with an expiration date.

The indicia acts as a "stamp" which is used to grant/deny passage of the data files to selected users within the regulated state.

In practice, using the Internet as an example, data providers obtain the "stamp" from the regulating entity (i.e. the state government) or the central agency. The "stamp" is affixed to the data file by the data provider.

The data provider then provides the data for access via the Internet. When the data is being transferred over the Internet, the access providing computer (which acts as an interface between a user's computer and the Internet) checks for the "stamp" and sends an inquiry via the Internet to the central agency's or regulating entity's computer. The "stamp" is check for authenticity (i.e. validity as to date and also as to the state where the access providing computer resides).

Based upon the authenticity of the "stamp", the access providing computer passes the data to the user computer. If the stamp is invalid, then a message is passed to the user that access cannot be gained.

In this manner, the regulatory entity is able to monitor and control subject matter which is communicated to the user. In the example above, each state is able to regulate content distributed within that state. "Adult" material can be selectively excluded from a state that so desires (i.e. "Adult" material that is acceptable in New York or California can be excluded from Tennessee). Further, the fees collected by the state are ideally used to upgrade the distributed computer system within that state.

Another attribute of this invention relates to passwords and downloading of content material over a distributed computer system.

For the system of passwords for use within a distributed computer system, a user-generated password is used in conjunction with data indicating the access computer to make a pass/no-pass decision.

The present invention effectively establishes a two component password set which requires the user to provide only one of the components. The second half of the password set is provided from the access computer through which the user gains access to the distributed system.

Since the remote user's access computer (and often the remote user's own computer) is uniquely identified, the system is much more secure than the existing practices. Under the existing practice of requiring the remote user to enter the two components, once these components are known to a third party, that third party can use the components from any computer. The present invention though requires the user to provide only a single component (the second component is provided automatically by the user's computer); should the user-supplied component become known to a third party, this purloined information is worthless since to use the now-known component to gain access to the distributed system, the third party must also be using the valid user's computer.

Another aspect of the present invention is its ability to permit multiple user's to have identical passwords. Currently, only a single individual can have a specific password (i.e. "PTO") and all others must be different (i.e. usually accomplished by some simple variations such as "PTO1", "USPTO", etc.).

Since the present invention uses an identifier from the specific user's computer, the user supplied component does not have to be unique. As example, there can an unlimited number of users who use the password "PTO" if each user is operating from a unique computer (which is the practical situation).

The pass/no-pass decision is not affected by this apparent redundancy since the additional information provided by the user's computer provides for unique identification of the user.

The distributed network of computers is any of a variety of systems such as the Internet and World Wide Web in which remote computers gain access to the network via an access computer. Those of ordinary skill in the art readily recognize a variety of such systems which serve in this capacity.

In general, a distributed network of computers is a set of computers which are inter-linked with a communication system so that data and instructions are transferable between the computers on the network. A remote computer not on the network, obtains access to the distributed network by accessing one of the computers on the distributed network to act as an intermediary. The accessing computer allows the remote computer to "talk" on the network and to obtain information/data from other computers on the network.

The remote computer carries with it the access computer's indicia. In many distributed systems this indicia uniquely identifies both the access computer and the remote computer. As example, for applications on the World Wide Web or the Internet, this indicia is referred to as "Internet Protocol Address" or "IP Address". The IP Address contains data uniquely identifying both the access providing computer as well as the remote computer and is supplied by the access providing computer.

Another identifying system is referred to as a "certificate" which identifies the remote computer.

This use of a "certificate" as an identifier also provides the ability of the same computer having different identifiers within different "workspaces". The same program may be used in different applications or by varying parties (i.e. browsers) as different workspaces. Each such workspace would have its own unique identifier which is defined in the certificate associated with that workspace.

When a security check is required, the user enters a single password which is used in conjunction with the indicia (i.e. the IP Address for an Internet application) in a comparison operation with the stored data to make a pass/no-pass decision.

The computer performing the security check is on the network and has previously created a memory of authorized sets. Each of these sets contains a user-supplied password as well as the indicia from the access providing computer. The two elements of the set uniquely identify the authorized recipients of the information at the data computer.

When an inquiry is made to obtain access to the data stored within the data computer, the data computer accepts the user-supplied password and the indicia from the access providing computer and compares the presented information to the stored authorized user's sets. This comparison step generates a comparison value which is used to make the pass/no-pass decision.

This sequence of steps assures that only the user creating the password from that remote computer is able to gain access to the data.

Should the remote user change computers, then in an alternative embodiment, the remote user is queried to identify the "customary" access providing computer. With this information, the data computer is able to reconstruct the accessing computer's indicia. With this re-constructed indicia, a check is made of the memory to see if the requesting party is an authorized recipient for the information.

Another important aspect of the present invention relates to protection of proprietary information which is communicated over the Internet, World-Wide-Web, or other such distributed computer systems. In these applications, a supplier of information, a merchant, owns certain proprietary rights to information. This information includes such items as software, images, and an assortment of data groups.

Protection of this material from unauthorized usage by third-parties who have not acquired the right to use the information is extremely important.

Two separate techniques are employed by this invention and are both implemented for use on networks of computers such as the Internet or the World-Wide-Web.

The first technique which is employed is a pro-active technique in which down-load software is tailored to work only on the computer which has acquired the rights to use the software. The same down-loaded software package, while operational on computer "A", will not operate on a different computer.

In this context, the technique recognizes that two computers are to be used on the Net. One which down-loads or receives the software, and a second which passes the software onto the network to be retrieved by the first computer.

The second computer, receives the IP address, certification, or other unique indicia from the first computer (this information uniquely identifies the first computer) and combines the information with the program which is to be down-loaded. This creates the framework to assure that the receiving computer, which has authorization, is the only one which is able to operate the down-loaded software or operational program.

Only authorized usage is permitted when the down-loaded program:

compares a resident indica identifying the computer attempting to run the program to an indicia within the program. This indicia within the program uniquely identifies the authorized computer. A comparison value from this operation is generated (i.e. pass/fail, 0/1).

using this comparison value, the program aborts or terminates performance of the software if the computer attempting to run the program is not the authorized one.

In one embodiment of the invention, this is taken one step further in which, should the computer attempting to run the program not be the authorized one, then a message, such as an e-mail, is sent to the merchant of the software notifying the merchant that an unauthorized attempt is being made to run the program.

This approach also, in one embodiment, permits the merchant's distribution program to change or modify the indicia within the program so that the down-loaded software will run on a replacement computer. In this scenario, the merchant or source of the software program is contacted by the authorized user and is informed that the authorized user has obtained a newer or different computer system. The merchant, via his computer, accesses, via the Internet, the down-loaded program at the user's new computer and changes the stored indicia within the program to match the new computer. In this manner, the user is able to readily change computers and still utilize the properly acquired software.

As noted earlier, the indicia used by the program uniquely identifies the authorized computer and in the preferred embodiment includes, some if not all of, the IP address for the user.

Another approach of the present invention uses existing legal mechanisms to actually stop or curtail the unauthorized dissemination of proprietary information. While the laws of copyrights have excellent mechanisms to stop "pirating" of software, images, and other data, the practical problem of identifying which data has been misappropriated and by whom still exists.

The approach to this problem taken by this invention is to create an identifying data configuration (a.k.a "fingerprint") within the material to be protected. This identifying data is one of several items including, but not limited to: the IP address of the authorized user already discussed, a copyright notice, an invisible data configuration, or a series of executable statements within the program.

Regardless of the form of the identifying data configuration, a computer on the network is equipped to monitor for this identifying configuration. When the identifying configuration is encountered by the Network computer, the party who sent the proprietary information and the party receiving the proprietary information is easily identified by the customary routing information which accompanies such messages. This event is communicated to the merchant of the proprietary information (in one embodiment, if the source of the proprietary information is the merchant, then no notice is given).

In a converse situation, the planting of an identifying configuration onto a web-site page serves as a deterrent to "hackers". Any out-going communications from the web-site are ignored by the present invention, only data being sent to the web-site which contain the identifying configuration (e.g. those that are being up-loaded to the site, as is common among hackers) are flagged and reported to the owner of the web-site.

This technique employs the use of a computer within the network itself which:

accepts a data packet having routing information and a data stream;

checks the data stream for a pre-selected data configuration (the identifier or fingerprint);

if the pre-selected data configuration exists in the data stream, communicates the routing information to a selected receiver (such as the merchant) associated with the pre-selected data configuration; and, passes the data packet to a destination associated with the routing information.

It is then up to the merchant or source of the proprietary information to take whatever legal steps they deem appropriate.

These two techniques, either singly or in combination, create a network in which proprietary information is safely communicated.

The invention together with various embodiments thereof will be more fully explained by the accompanying drawings and the following descriptions.

DRAWINGS IN BRIEF

Figure 6A:
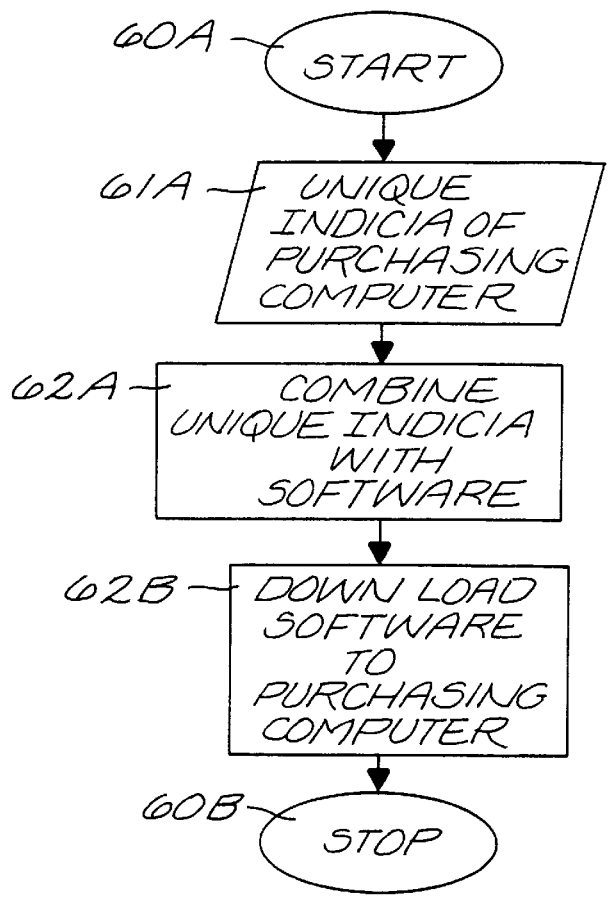
Figure 6B:
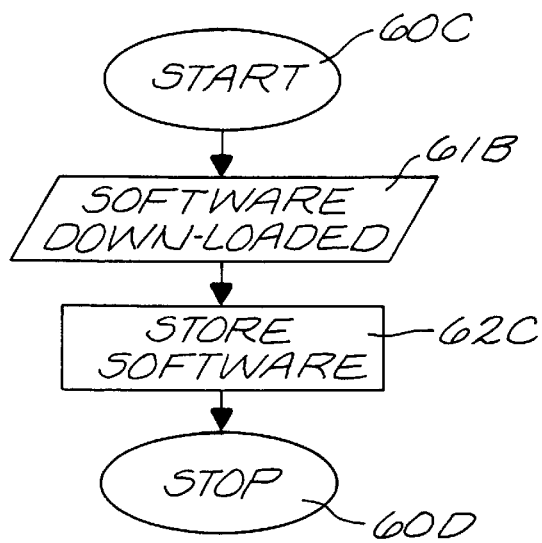
Figure 6C:
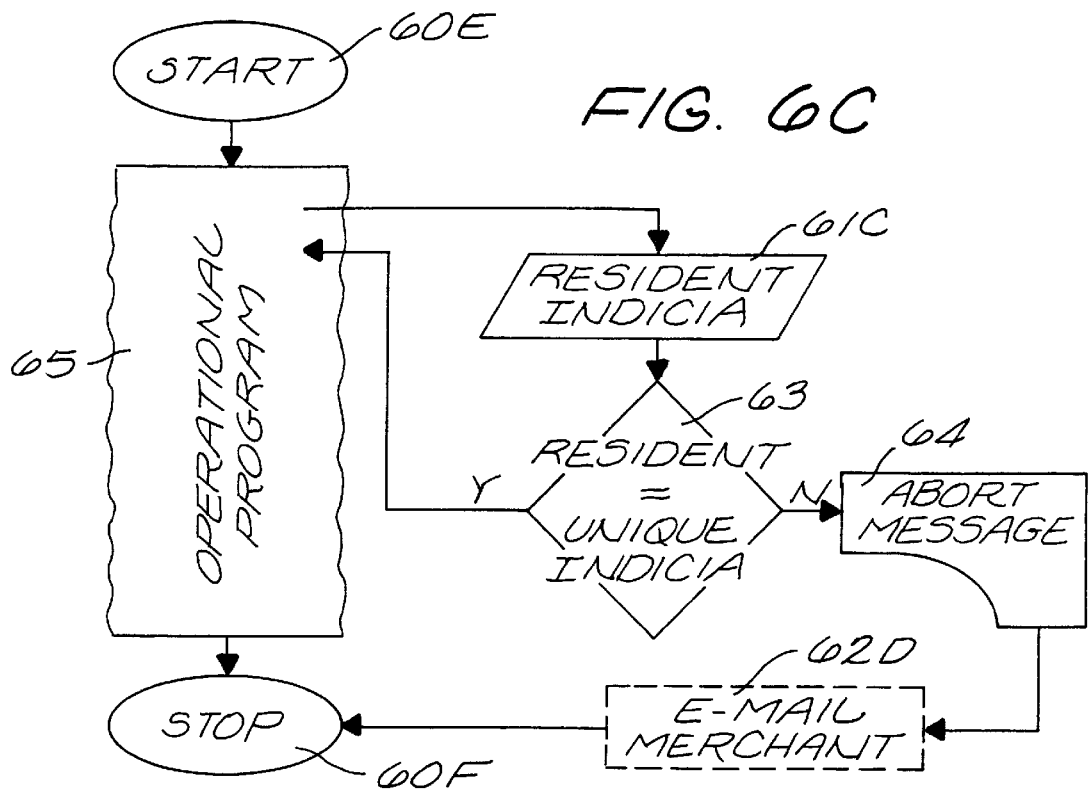

FIGS. 6A, 6B, and 6C are flow-charts of the preferred embodiment for protecting down-loaded software.

Figure 7:
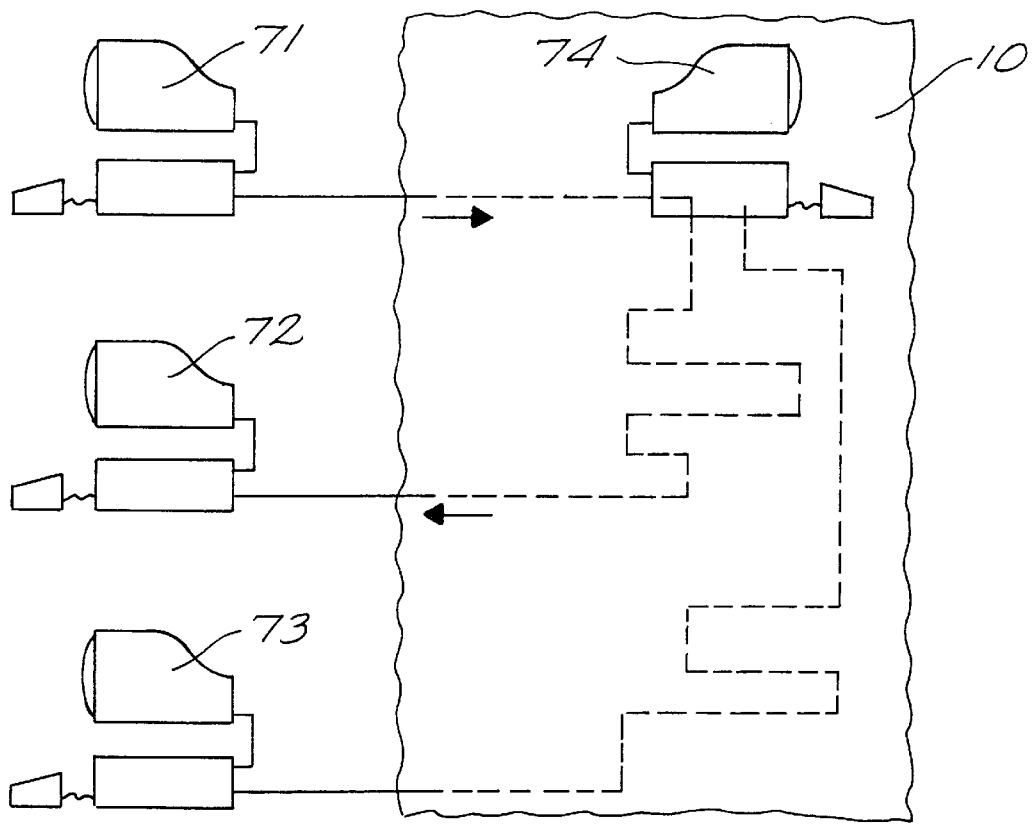

FIG. 7 graphically illustrates the operation of the preferred embodiment for identifying proprietary information being transmitted over the distributed network.

Figure 8A:
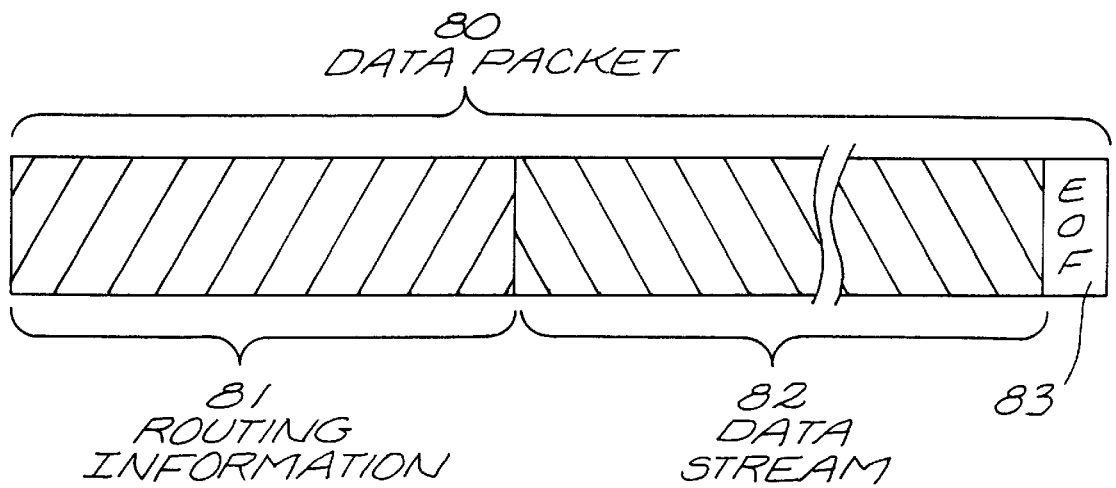
Figure 8B:
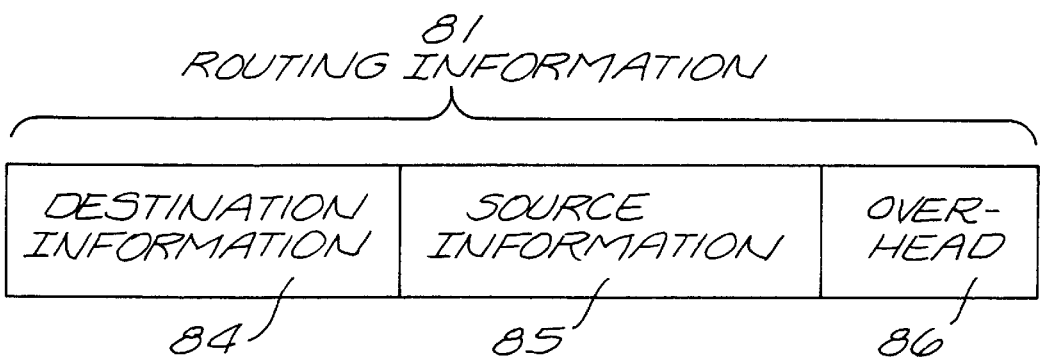
Figure 8C:
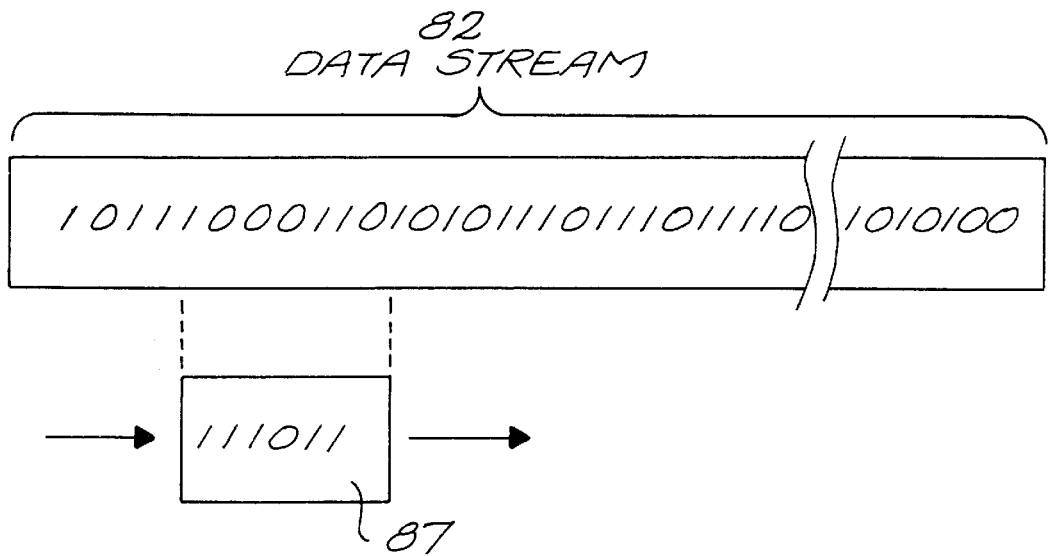

FIGS. 8A, 8B, and 8C graphically illustrate the data packet and how its components are used to identify proprietary information being transmitted over the distributed network.

Figure 9:
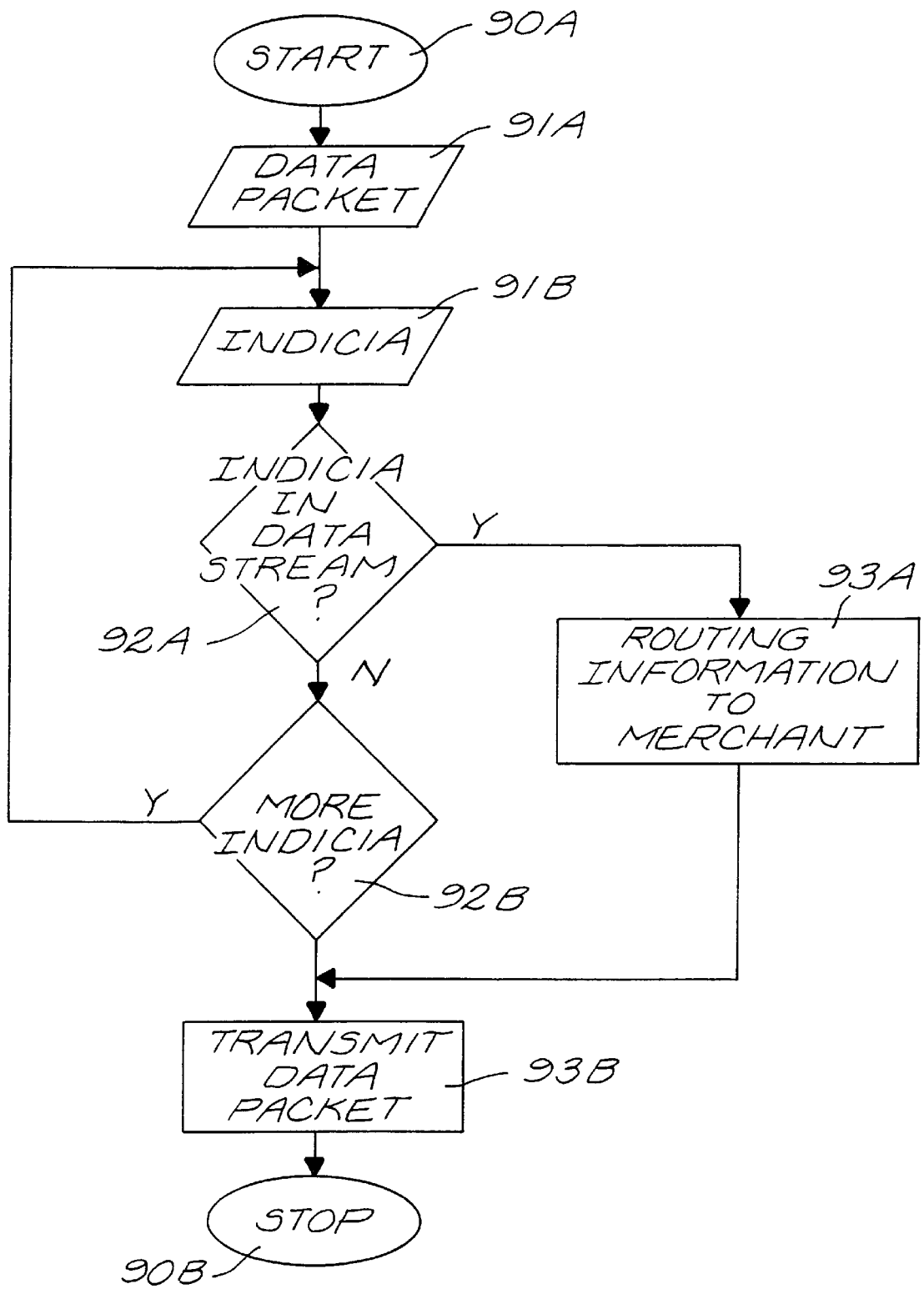

FIG. 9 is a flow-chart of the operation of a network computer used to identify proprietary information transmitted over the distributed network.

FIGS. 10A and 10B are flow-charts showing the preferred operation of the access provider computer and the regulatory computer for the regulated system.

DRAWINGS IN DETAIL

Figures 1, 2:
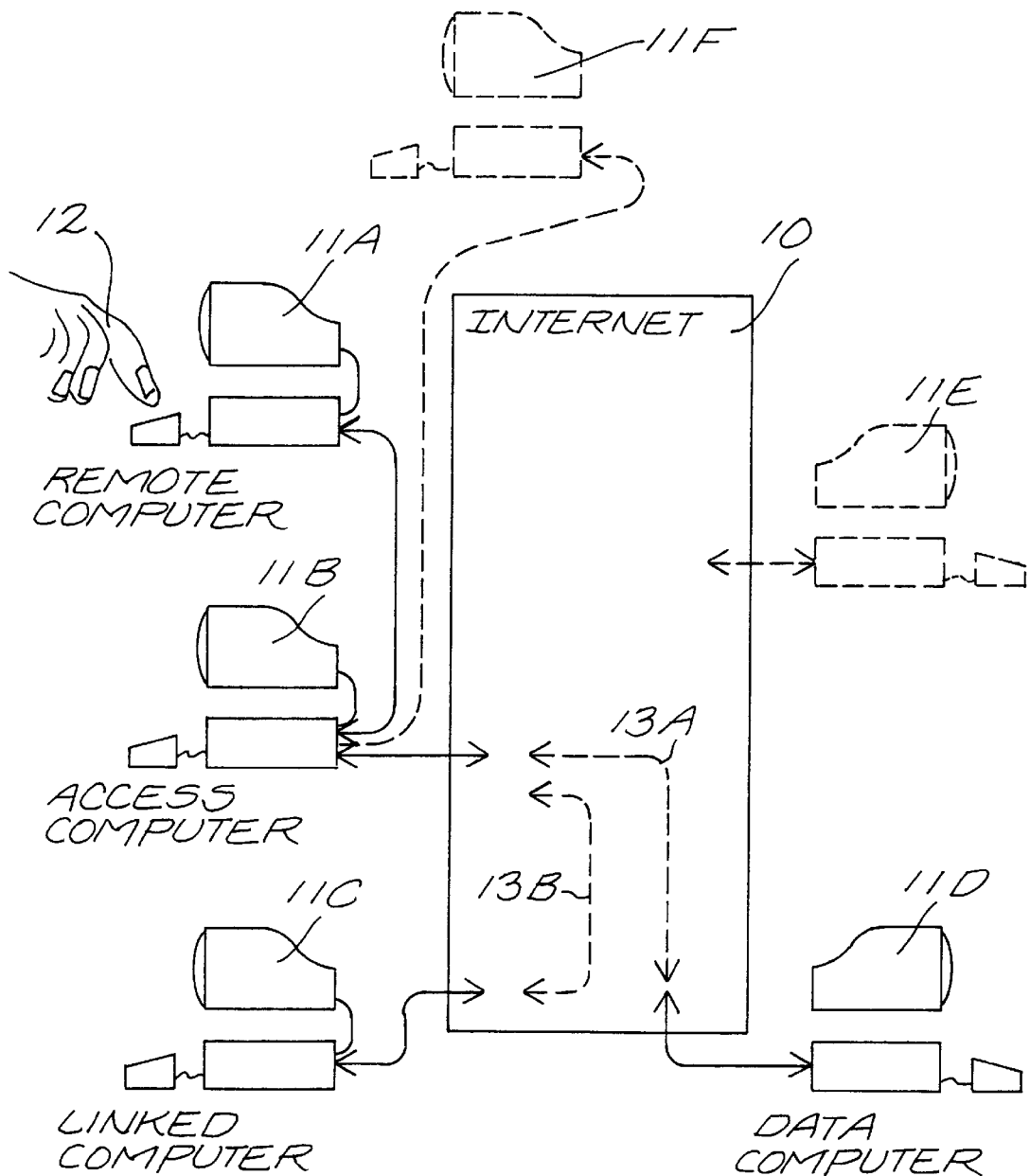
FIG. 1 is a functional layout of the preferred embodiment of the invention.
FIG. 2 illustrates the IP Address structure used in the preferred embodiment of the invention.

FIG. 1 is a functional layout of the preferred embodiment of the invention.

In this illustration, Internet 10 provides a communication means permitting various computers to communicate commands and data between each other. In this illustration, computers 11B, 11C, 11D and 11E, are connected to Internet 10.

Access computer 11B provides the ability of computers 11A and 11F to gain information from Internet 10.

In this illustration, remote computer 11A is seeking data from Data Computer 11D. A connection 13A is made between the Access computer 11B and the Data computer 11D permitting information to flow from data computer 11D to remote computer 11A, and vice versa.

Remote user 12 enters his/her single password which is communicated to data computer 11D; additionally, the IP Address is communicated by Access computer 11B. These two elements are used by data computer 11D to ascertain if data should be transmitted to remote computer 11A.

If the IP Address and the remote-user generated password are acceptable, in this embodiment, then link 13B is created between Access computer 11B and linked computer 11C. Linked computer 11C is then able to transmit data to remote computer 11A via the access computer 11B.

In an alternative embodiment, data computer 11D communicates the data directly to the access computer 11B and linked computer 11C is not utilized.

This same operational layout is also applicable for the regulatory system of the present invention.

As illustrated, Internet 10 is a distributed system of computers whereby a remote computer or user computer 11A gains access to the distributed system via access computer 11B.

Data computer 11D provides data files to the distributed system, the Internet 10. Authorized data files which are provide by data computer 11D are marked with an indicia.

The granting of the indicia, in this example, is made by a variety of authorizing entities such as Internet Service Providers and governmental entities and are recorded onto a data base within linked computer 11C. Awarding the indicia is accomplished through a variety of mechanisms and may involve an off-line application and processing or a regulatory agency such as Internic for the Internet.

The "stamp" is affixed to the data file on Data Computer 11D. When the data is being transferred over Internet 10, access computer 11B withdraws the stamp and sends an inquiry, arrow 13B, to the linked computer 11C. The linked computer checks for the "stamp" within its internal data base and responds to the Access Computer 11B which establishes an "acceptance flag" based upon the response from linked computer 11C.

Based upon the "acceptance flag", access computer 11C selectively passes or denies passage of the data file to the user computer 11A.

FIG. 2 illustrates the IP Address structure used in the preferred embodiment of the invention.

While there are a variety of addresses which identify the access computer and others that identify the remote user, the present invention's preferred address is the IP Address which is structured as illustrated in FIG. 2.

The first three sets of digits "XXX", "YYY", and "ZZ" are used in identifying the access provider and the user. This grouping is used in conjunction with the remote user's provided password to grant or deny access.

Figures 3A, 3B:
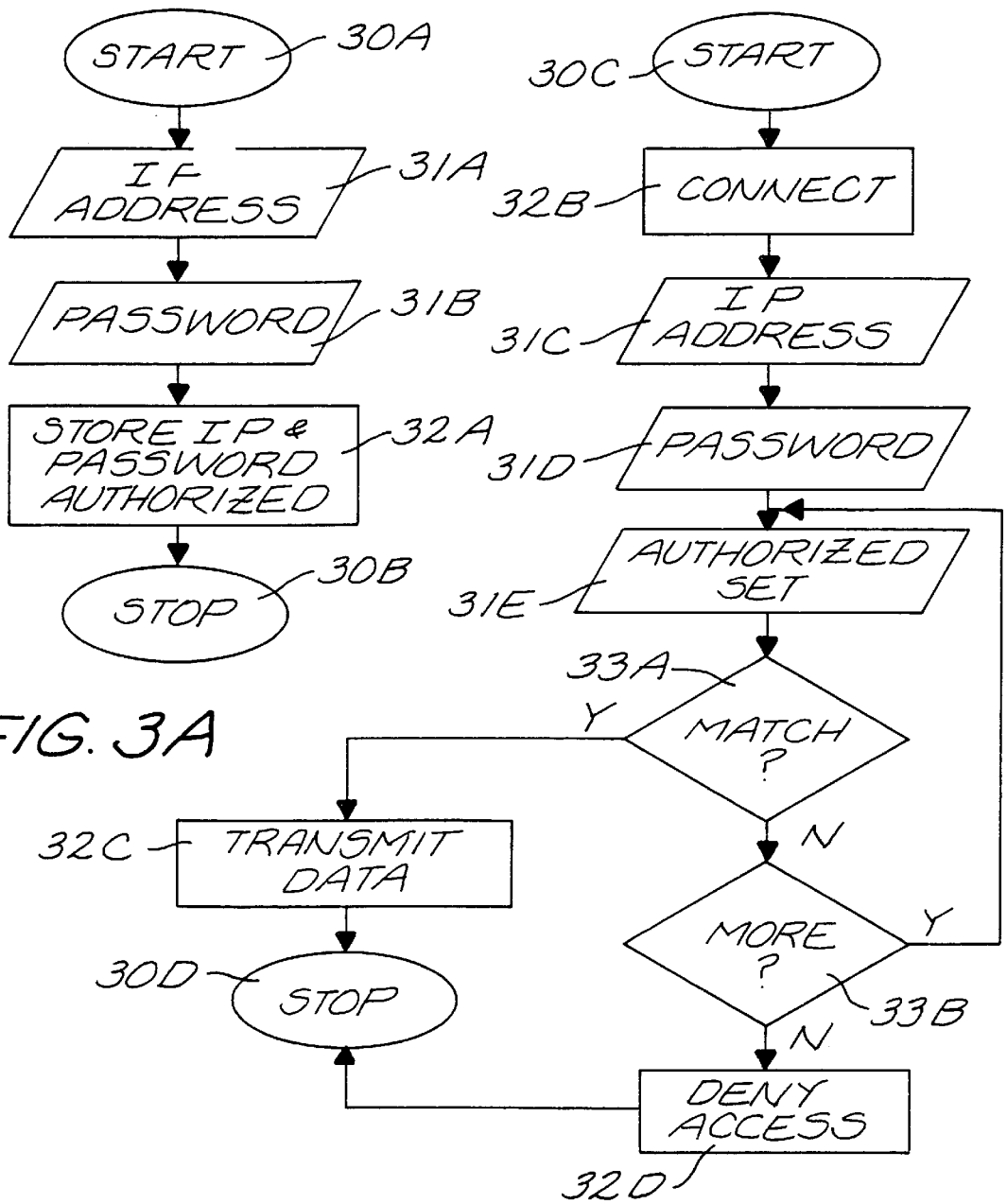
FIG. 3A is a flow-chart for the establishment of the password set used in the preferred embodiment.
FIG. 3B is a flow-chart of the preferred embodiment's password authentication and data transmission.

FIG. 3A is a flow-chart for the establishment of the password set used in the preferred embodiment.

Once "start" 30A has occurred, the data computer first receives the IP Address 31A directly from the Access Computer. The Password is then received 31B from the Remote Computer via the access computer.

The "authorized" record is created by storing the IP Address and the Password into memory.

The program then "stops" 30B.

This program permits the Data Computer to establish a file of authorized sets containing the IP Address and the Password which are to be used to authenticate a valid user.

FIG. 3B is a flow-chart of the preferred embodiment's password authentication and data transmission.

Immediately after "Start", 30C, a connection 32B is made with the access computer. This connection generates the IP Address 31C and after a query to the remote user, the Password 31D.

Using this proposed set of IP Address and Password, an authorized set is withdrawn from memory 31E and is compared therewith 33A. If a match occurs, signifying an authorized user, the data is transmitted 32C and the program stops 30D.

If there isn't a match 33A, then a determination is made on if there are more sets within memory 33B. If there are, then the program cycles back to pull the next authorized set for comparison 31E; otherwise, access is denied 32D and the program stops 30D.

This technique allows an inquiry to be quickly reviewed to see if the inquiry is authorized or not. An authorized inquiry is provided the requested data; an unauthorized inquiry is terminated.

Figures 4A, 4B:
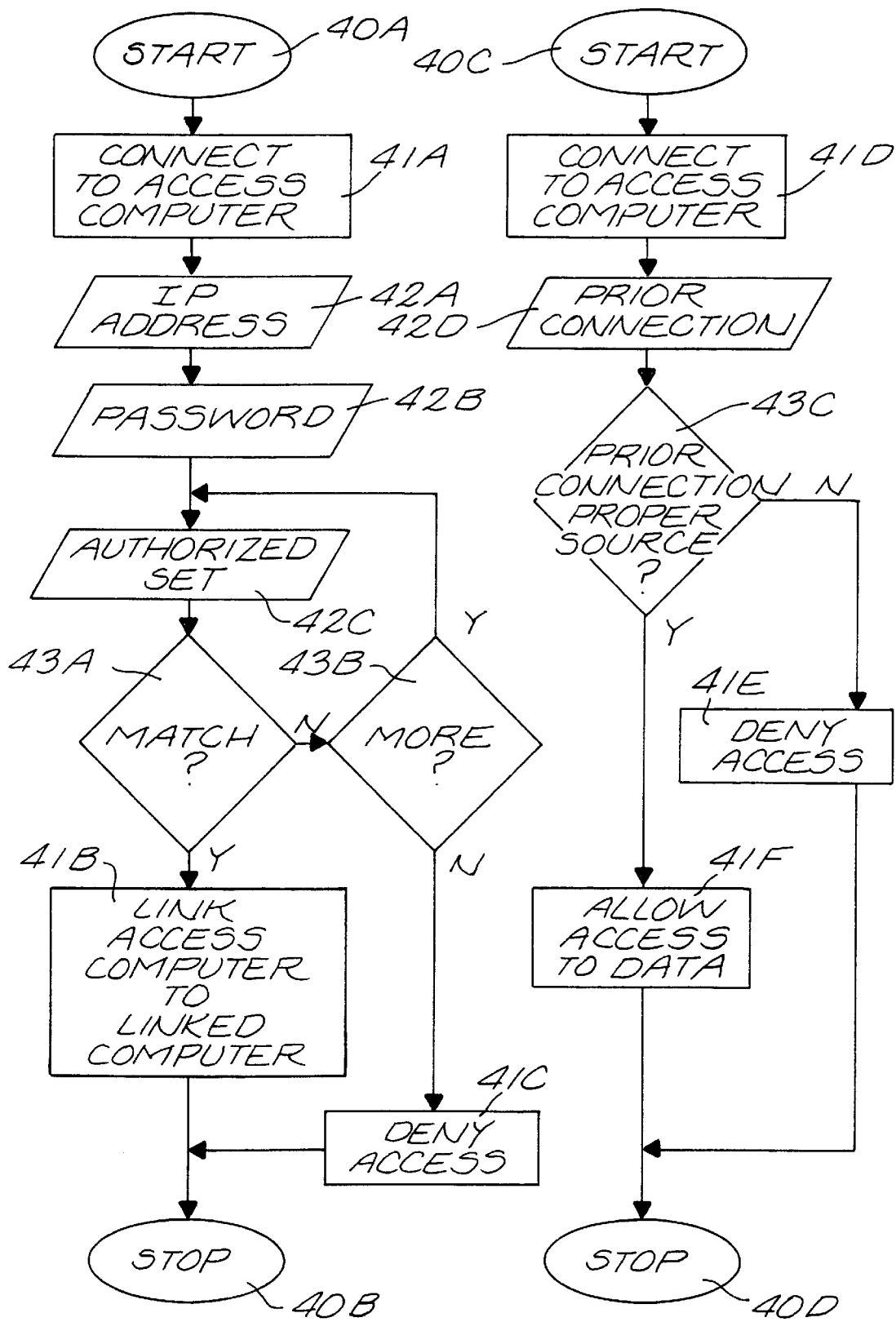
FIG. 4A is a flow-chart of an alternative embodiment in which once the password is authenticated, the accessing computer is linked to another computer.
FIG. 4B is a flow-chart for the linked computer showing the security check from the prior connection.

FIG. 4A is a flow-chart of an alternative embodiment in which once the password is authenticated, the accessing computer is linked to another computer.

In some situations, the computer used to make the authentication is not the computer that stores the desired data. Often a single authenticating computer is used to perform the authentication; then the authorized user is linked to the one of many computers to access the desired data.

After "Start" 40A, the program connects with the Access Computer 41A and gathers the IP Address 42A therefrom. The Password is then collected from the remote user 42B.

An authorized set 42C is pulled from memory and it is compared to the submitted IP Address and Password 43A to determine if there is a match. Should a match occur, then the Access Computer is linked to a "Linked" computer 41B where the data is stored. The program then stops 40B.

If no match 43A occurred, then a determination as to if there are more authorized sets 43B is made; if there are more, then the process cycles back to pull another authorized set from memory 42C; otherwise, access is denied 41C and the program stops 40B.

FIG. 4B is a flow-chart for the "linked" computer showing the security check from the prior connection.

After "Start" 40C, the "linked" computer is connected to the Access computer 41D. A check is made as to what was the prior connection 42D for the access computer.

The data within the "Linked" computer is only to be given if the access computer has passed the tests from the "Data" computer (see FIG. 4A). For this reason, the prior connection is check to see if the access computer has proceeded from the proper source 43C.

If the access computer has come from the proper source, then access to the data is permitted 41F and the program "Stops" 40D; it the access computer did not come from the proper source, then access is denied 41E and the program "Stops" 40D.

In this manner, illustrated in FIGS. 4A and 4B, a single computer is able to process the passwords and grant the users access to a wide variety of other computers, each having unique data stored therein.

Figure 5:
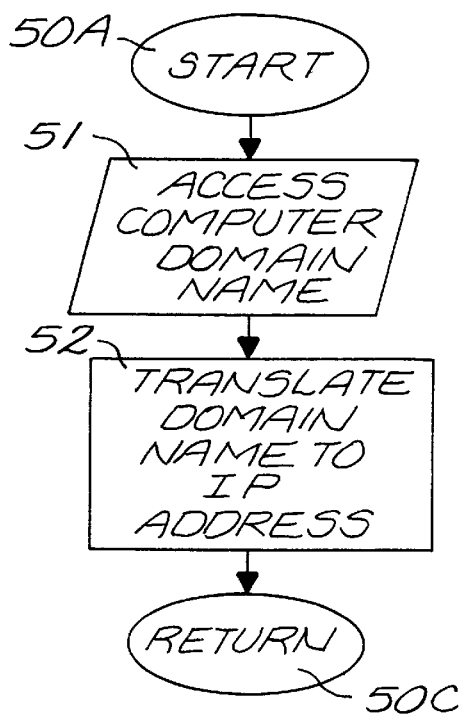
FIG. 5 is a flow-chart for a subroutine which will recreate the IP Address for the preferred embodiment.

FIG. 5 is a flow-chart for a subroutine which recreates the IP Address for an alternative embodiment.

In some situations, the remote user is not using his/her "regular" computer or going through the same access computer to gain access to the Internet. In this situation, it is still necessary to allow the user proper access. The subroutine of FIG. 5 does this.

Once "Start" 50A has occurred within the subroutine, the remote user is queried as to the "domain" name for the "regular" access computer 51. This domain name is used to recreate the IP Address 52 (as is used in the prior discussion) and the subroutine returns 50B.

FIGS. 6A, 6B, and 6C are flow-charts of the preferred embodiment for protecting down-loaded software.

FIG. 6A is a flow chart of how one embodiment of the invention down-loads software over the network. Once start has occurred, 60A, the unique indicia from the purchasing computer is obtained as discussed before (i.e. a certificate identifier) 61A and this indicia is combined with the software 62A. The now unique software package, tailored for an individual computer system, is down-loaded 62B onto the purchasing computer and the program stops 60B.

In an alternative embodiment of this system, an inventory of software packages is created wherein each package has a unique "serial number" assigned to it. When an order is received, the next software package is down-loaded and the certificate on the purchasing computer is altered (such as through a plug-in) to reflect the "serial number". Each such down-loaded software package will only operate on a machine which has the correct serial number on the certificate plug-in.

The purchasing software's operation is illustrated in FIG. 6B. Immediately after start, 60C, the software is down-loaded 61B and then stored, typically in a non-volatile memory such as a disc drive, 62C. The operation is completed and the down-load operation stops 60D.

Now that the operational program has been down-loaded, FIG. 6C illustrates how the current protection mechanism operates. In a normal situation, the operational program/ software which has been down-loaded proceed from a start 60E, through some operations 65, to a stop 60F. The present invention provides for a minor extension or subroutine which is used to assure that the operational program is on the proper computer.

This extension or subroutine first pulls the resident indicia 61C from the computer operating it. As noted before, this resident indicia is anything which can be used (i.e. a certificate or the like) to uniquely identify the computer. In the alternative embodiment described in FIG. 6A, the resident indicia was the serial number of the down-loaded software.

The resident indicia is then compared to the unique indicia which had been programmed into the operational program. If the two match (e.g. the software is operating on the authorized machine), then the subroutine returns to the operational program; otherwise, the user is attempting to operate the software on an unauthorized platform and an "abort" message is given 64. This message notifies the user that the operational program is not authorized for use on that machine.

In one embodiment of the invention, an e-mail is then automatically sent to the merchant 62D notifying them of the unauthorized usage.

The program then stops 60F. In this manner, an unauthorized user is unable to utilize the program.

FIG. 7 graphically illustrates the operation of the preferred embodiment for identifying proprietary information being transmitted over the distributed network.

Within the internet 10, is a network computer 74 which monitors data traffic within the internet 10. A message from computer 71 to computer 72, or a portion of such message, sometimes passes through network computer 74. Due to the structure and operation of the internet 10, not every message will pass through network computer 74, but, some will, and these message will be monitored.

This monitoring operation scans through the message to see if the message contains one of the pre-selected indicias which have previously been identified by the merchant of the material (i.e. software, images, data, etc.). If the pre-selected indicia exists in the message being transmitted, the routing information used for the message is communicated from the network computer 74 to the merchant computer 73; it is then up to the merchant to take whatever legal steps the merchant so desires.

The mechanism illustrated in FIG. 7 provides the identification of the transmittal so that existing legal mechanisms are able to curtail the unauthorized dissemination of proprietary information.

The approach illustrated here creates an identifying data configuration (a.k.a "fingerprint") within the material to be protected. This identifying data is one of several items including, but not limited to: the IP address of the authorized user already discussed, a copyright notice, an invisible data configuration, or a series of executable statements within the program.

Regardless of the form of the identifying data 17 configuration, a computer on the network is equipped to monitor for this identifying configuration. When the identifying configuration is encountered by the Network computer, the party who sent the proprietary information and the party receiving the proprietary information are easily identified by the customary routing information which accompanies such messages. This event is communicated to the merchant 73

FIGS. 8A, 8B, and BC graphically illustrate the data packet and how its components are used to identify proprietary information being transmitted over the distributed network.

A data packet is configured in a variety of different ways. This illustration is used to exemplify the operation which takes place. Data packet 80, in this illustration has two major components, the routing information 81 and the data stream 82. The end of data packet 80 is marked by and End-Of-File ("EOF") 83.

The routing information 81 is itself composed of generally three sections being: destination information 84; source information 85; and various other overhead information 86. The destination information 84 assists in routing the data to the proper location; the source information 85 identifies where the data originated so that an error message can be delivered if data packet 80 does not arrive in-tact.

Data stream 82 is the data itself, illustrated here as a series of "0"'s and "1"'s. Data stream 82 includes a variety of data including: software programs, images, raw data, or anything else that is to be communicated over the network.

This data stream 82 is cross referenced against a preselected indicia 87 which serves as a "fingerprint" for data streams which are to be monitored. By moving indicia 87 along data stream 82, a check is made to see if there is a match.

While this illustration shows a single indicia, the invention contemplates that a series of "fingerprints" originating from many different merchants be used.

If a match occurs, then the data stream contains proprietary information. The routing information is then sent to the merchant associated with the matching "fingerprint".

In some embodiments of the invention, even after a match occurs, the routing information is checked to see if either the data is either coming from or going to the associated merchant. These two scenarios (coming from the merchant indicates a down-load operation; go to the merchant indicates a hacker up-loading) are then selectively used to make the decision to notify the merchant or not.

Notification of the merchant includes the routing information so that the party improperly using the proprietary information is unique identified.

FIG. 9 is a flow-chart of one embodiment of the operation of a network computer used to identify proprietary information transmitted over the distributed network.

Once the monitoring program is started 90A, the data packet is obtained 91A and an indicia ("fingerprint") is obtained 91B. The indicia is compared to the data stream and a determination is made if the indicia is found within the data stream 92A. If it isn't, the library is searched for another indica 92B and the cycle repeats itself if there are more indicia to compare.

If the indicia is found 92A, then the routing information is communicated to the merchant 93A.

When the entire list of indicias has been reviewed, or if a match has been found, the data packet 93B is communicated on through the network to find its ultimate destination and the program stops 90B.

In an alternative embodiment of this operation, the data packets are simply stored for later, off-line review of "fingerprints" while the data packet is sent along its way through the network.

In either case, data packets containing the "fingerprints" are identified for the merchant so that proper legal remedies can be utilized to protect the proprietary data.

FIGS. 10A and 10B are flow-charts showing the preferred operation of the access provider computer and the regulatory computer for the regulated system.

The preferred operation of the access computer is illustrated in FIG. 10A. Once start 100A has occurred, the data file is obtained 101A via the network. From the data file, the stamp or indicia is identified within the data file 102A. The stamp/indicia is then transmitted, preferably via the network, to the regulatory computer 101B. In the preferred embodiment, the access computer also communicates its location 101B. The location of the access computer determines the state where proper registration should have been obtained for the data file to be properly communicated.

An indication of the "acceptance" of the "stamp" is then received 101C by the access computer from the regulatory computer. This "acceptance" indicates whether that particular data file is authorized to be communicated to the user in that particular state (i.e. Arizona, Alabama, etc.). Restriction on the passage of data file is preferably intended to provide a level of control assuring that the content is appropriate for the user.

As example, a company may establish this regulatory situation so that its employees' access to content from the Internet is restricted to work related materials.

Using the acceptance indicator, a flag is established 102B within the access computer. This flag indicates if the stamp is valid 103. A valid stamp allows the data to be transferred to the user 101D; for an invalid stamp, an error message is generated and communicated to the user 101E. The program then stops.

The preferred operation of the regulatory computer is given in figure 10B. After start 100C, the stamp and the state are received 101F from the inquiring access computer. In the preferred embodiment, the state of the inquiring access computer is established using the IP address of the inquiring access computer. The materials above discuss the IP address and its usage to identify both the end user and the access computer.

With the stamp and the state data, the data base is checked 102C to see if they create a valid authorized match. The data base includes sets of data having stamps, state, and expiration dates.

Based upon the search of the data base, an acceptance indicator is established 102D (i.e. A/N, A=Authorized/N=Not Authorized) and is communicated back 101G to the inquiring access computer. The program then stops.

It is clear that the system, as outlined above, creates an efficient regulatory system for a variety of computer networks for such areas as the internet, company intranets, and a host of other distributed computer systems.

What is claimed is:

1. A regulatory system comprising:
    a) a regulatory computer having memory means for storing a series of data sets, each of said data sets containing a unique indicia, fee expiration data, and authorized locale, wherein said regulatory computer includes means for,
        1) receiving an identifier and a locale indicia from a remote computer, and,
        2) communicating an acceptance flag to the remote computer based upon a comparison of said identifier and the locale indicia with said data sets;
    b) a supply computer having content data, said supply computer remote from said regulatory computer;
    c) a user computer remote from said regulatory computer;
    d) an access computer remote from said regulatory computer;
    e) a communications network linking said regulatory computer, said supply computer, and said access computer for communication therebetween; and,
    f) a linkage means, connecting said user computer and said access computer, for communicating data between said user computer and said communications network via said access computer; and,
    wherein said access computer includes means for:
        1) receiving said content data from said supply computer via said communications network,
        2) obtaining from said content data, an identifier,
        3) communicating said identifier and a locale indicia indicative of a physical location of said access computer to said regulatory computer,
        4) receiving an acceptance flag from said regulatory computer, and,
        5) selectively passing said content data to said user computer based upon said acceptance flag.

2. The regulatory system according to claim 1, wherein said regulatory computer includes means for:
    a) uniquely identifying said access computer; and,
    b) establishing a location of said access computer.

3. The regulatory system according to claim 1, wherein said access computer includes memory means for storing said series of data sets.

4. The regulatory system according to claim 1, wherein said data sets within the memory means of said regulatory computer include an address, and wherein said regulatory computer includes means for:
    a) creating a message for a targeted computer associated with the unique indicia based upon said address and said fee expiration data; and,
    b) communicating said message to the targeted computer via said communication network.

5. The regulatory system according to claim 1, wherein said regulatory computer includes means for generating said acceptance flag for said access computer.

6. A networked computer adapted to permit user computers access to a network, said networked computer comprising:
    a) means for receiving content data from a remote supply computer;
    b) means for obtaining from said content data, an identifier;
    c) means for,
        1) communicating said identifier and a locale indicia to a remote regulatory computer, and,
        2) receiving an acceptance flag in response thereto; and,
    d) means for selectively passing said content data to a remote user computer based upon said acceptance flag.

7. The networked computer according to claim 6, further including means for communicating a locale indicia to said regulatory computer, indicative of a physical location of said access computer.

8. A regulatory computer comprising:
    a) memory means for storing a series of data sets, each of said data sets containing a unique indicia and location data; and,
    b) means for,
        1) receiving an identifier from one of a network of remote computers,
        2) creating a locale indicia for said one of a network of remote computers,
        2) generating an acceptance flag based upon a comparison of said identifier and said locale indicia with the series of data sets in said means for storing, and,
        3) communicating said acceptance flag to said one of a network of remote computers.

9. The regulatory computer according to claim 8, wherein said means for creating a locale indicia includes means for receiving said locale indicia from said one of a network of remote computers.

10. The regulatory computer according to claim 8, wherein said data sets within the means for storing include an address, and further including means for:
 a) creating a message for a targeted computer associated with the address and based upon the expiration data; and,
 b) communicating said message to the targeted computer.

11. A regulated system of computers comprising:
 a) a network of computers, each of said computers being remote from each other and having,
  1) a regulatory computer having memory means for storage of a series of data sets, each of said data sets containing a selected indicia,
  2) a supply computer,
  3) an access computer proving access for at least two remote computers to data within said network of computers, said access computer having means for,
   A) receiving content data and identifier data from said supply computer,
   B) receiving an acceptance flag based upon a comparison of said identifier data and a physical location of said access computer with data sets in said regulatory computer, and,
   C) selectively passing said content data to a selected user computer based upon said acceptance flag; and,
 b) at least two user computers in communication with said access computer.

12. The regulated system according to claim 11, wherein said regulatory computer includes means for identifying a locale of said access computer.

13. The regulated system according to claim 12, wherein said regulatory computer communicates data to said access computer based upon said locale.

14. The regulated system according to claim 12, wherein said data sets within the memory means of said regulatory computer include an address and an expiration date, and wherein said regulatory computer includes means for:
 a) based upon the address and expiration date, creating a message for a targeted computer associated with the unique indicia; and,
 b) communicating said message to the targeted computer via said communication network.

15. The regulated system according to claim 11, wherein said regulatory computer includes means for generating said acceptance flag for said access computer.

16. The regulated system according to claim 15, wherein said access computer includes means for communicating a locale indicia indicative of a physical location of said access computer to said regulatory computer.

17. The regulated system according to claim 16, wherein the means for generating said acceptance flag of said regulatory computer utilizes said locale indicia.

* * * * *